(No Model.) 2 Sheets—Sheet 1.

J. ALLINGHAM.
HEATING AND COOKING DEVICE.

No. 517,321. Patented Mar. 27, 1894.

Witnesses.
A. H. Opsahl.
E. F. Elmore.

Inventor.
James Allingham
By his Attorney.
Jas. F. Williamson.

THE NATIONAL LITHOGRAPHING COMPANY,
WASHINGTON, D. C.

(No Model.) 2 Sheets—Sheet 2.
J. ALLINGHAM.
HEATING AND COOKING DEVICE.
No. 517,321. Patented Mar. 27, 1894.
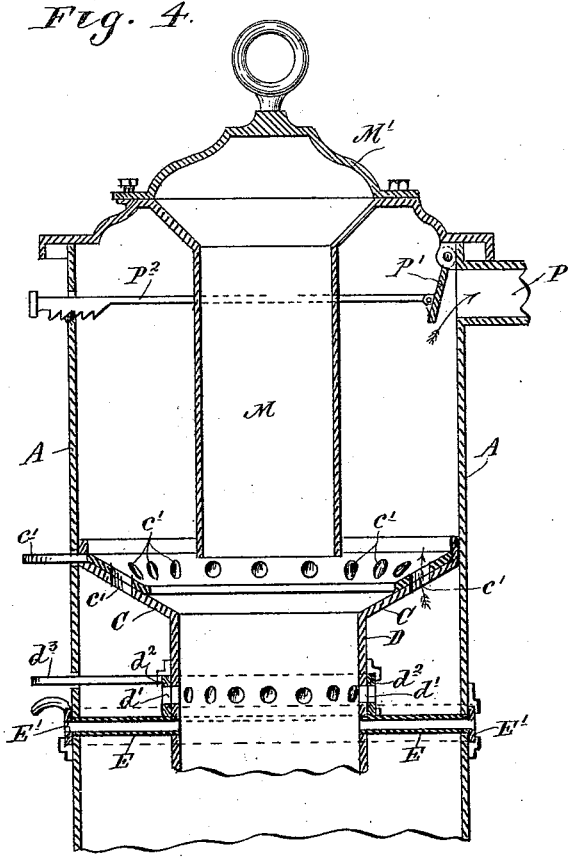
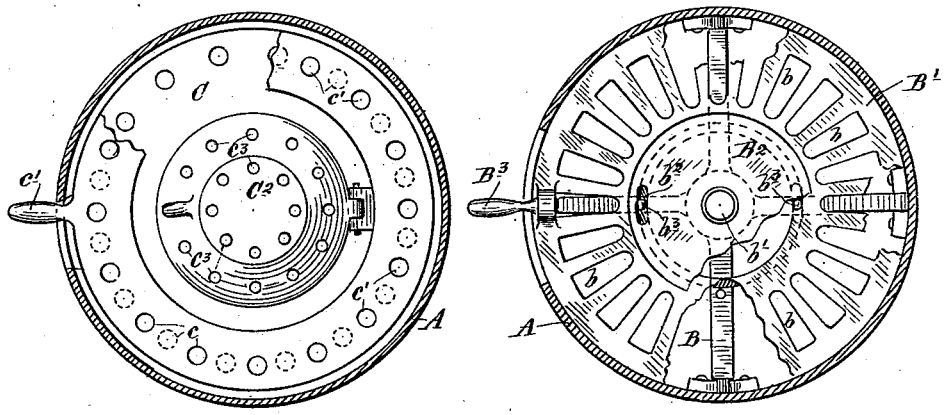
Witnesses.
A. H. Opsahl.
E. F. Elmore
Inventor.
James Allingham
By his Attorney.
Jas. F. Williamson
THE NATIONAL LITHOGRAPHING COMPANY,
WASHINGTON, D. C.

UNITED STATES PATENT OFFICE.

JAMES ALLINGHAM, OF MINNEAPOLIS, MINNESOTA.

HEATING AND COOKING DEVICE.

SPECIFICATION forming part of Letters Patent No. 517,321, dated March 27, 1894.

Application filed March 7, 1892. Serial No. 424,031. (No model.)

*To all whom it may concern:*

Be it known that I, JAMES ALLINGHAM, a citizen of the United States, residing at the city of Minneapolis, in the county of Hennepin and State of Minnesota, have invented certain new and useful Improvements in Stoves, of which the following is a description, reference being had to the accompanying drawings, forming part of this specification.

My invention relates to stoves; and has for its object to provide an improved construction, with a view of obtaining a better distribution of the heat and of securing economy in the consumption of fuel.

To this end the invention consists of certain novel devices and combinations of devices, which will be hereinafter fully described, and be defined in the claims.

The accompanying drawings illustrate my invention, wherein, like letters referring to like parts throughout—

Figure 1:
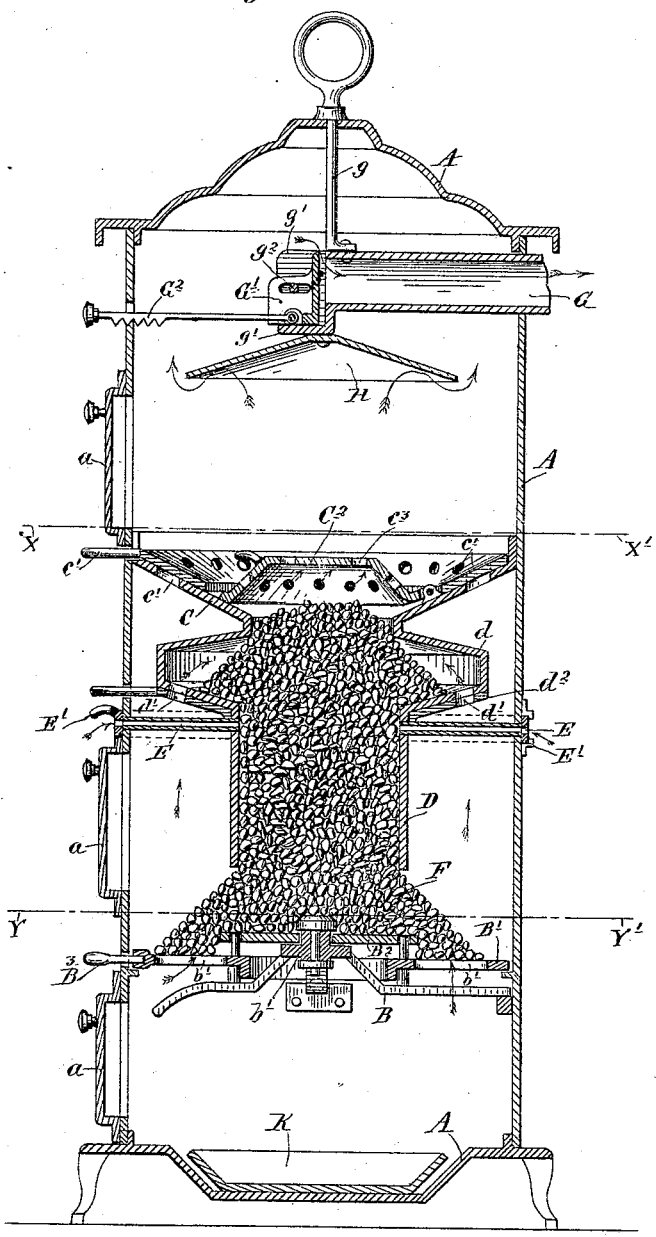
Figure 5:
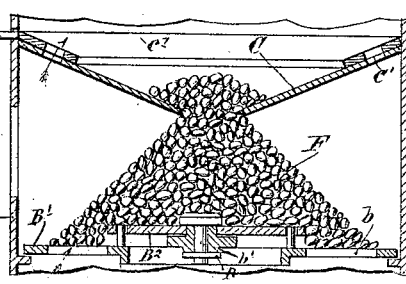

Figure 1 is a vertical central section, from front to rear, through a stove embodying certain of my improvements. Fig. 2 is a cross section, on the line X X' of Fig. 1. Fig. 3 is a similar section, on the line Y Y' of Fig. 1. Fig. 4 is a vertical section from front to rear through a stove of a slightly modified construction, with some additional or supplemental devices, some parts of the stove body being broken away. Fig. 5 is a view in section, with some parts broken away, showing a further modification.

A represents the stove casing, which may be of any suitable construction; and which is provided with a series of doors, $a$, suitably located, to give access to the interior of the casing, at points desired.

B is a tilting spider, for dumping the grate. B' B$^2$ are the outer and inner parts respectively, of the grate proper, which is suitably supported on the top of the spider. Of these parts, the outer section B' is constructed with openings or passages $b$, and the inner section B$^2$ is solid, or constructed without passages for the ashes or the draft. The inner or solid section B$^2$ is pivoted on a central raised head $b'$, projecting from the spider, and is connected with the open section B', by slots and pins $b^2$ $b^3$. The outer section B', is provided with means for the application of a shaker handle B$^3$, working through a slot in the casing. This special construction of the grate, permits the outer or open section B' to be given a limited rotary movement, without moving the central section B$^2$. This limited rocking motion of the grate is desirable in this particular stove, for a purpose which will presently appear.

C is a cross partition spanning the interior of the casing above the grate and provided with an annular register $c'$.

D is a fuel magazine, extending downward from the partition C. This fuel magazine, as shown in Fig. 1, is enlarged at its upper end, below the partition plate, as shown at $d$, to form an auxiliary or supplemental combustion chamber.

The fuel magazine D, is provided near its upper end with openings $d'$, for the inward passage of the burning gases from the primary combustion chamber. These openings may be under the control of an annular register $d^2$, operated by a handle $d^3$, extending outward through a slot in the casing. Fresh air supply ducts E extend inward from the exterior of the stove casing and terminate in the fuel magazine D, at a point for discharge of the fresh air into the burning gases within the fuel magazine. These fresh air supply ducts E, may be under the control of an annular register plate E'.

The fuel magazine D, as shown in Figs. 1 and 4, is of such diameter at its lower end, in respect to the diameter of the stove casing and the grate and terminates at such a point above the grate, that the fuel delivered therethrough will be held in a body, on the central or solid portion B$^2$, and the open annular portion B' in the form of a frustum of a cone, and will not spread out at the base sufficiently far to reach the walls of the stove casing. The position assumed by the coal, is shown at F, in Figs. 1 and 5. By this construction and relation of the fuel magazine and the grate, as shown in Figs. 1 and 4, or of the cross partition C and the grate, as shown in Fig. 5, a fire-pot may be dispensed with and the fuel will be held in a conical body on the grate, with the central portion of the body of the fuel over the solid or central portion of the grate, and with the base or outer margin of of the body of the coal, on the open portion B' of the grate. Hence, the combustion will take place only at the outer margin of the base of the body of coal. No combustion, whatever will take place, at the central portion of the body or pile of coal. The further action or operation will be traced later on.

C² is a door or pivoted cover over the fuel passage in the cross partition C, and is provided with small openings c³, for the upward passage of the burning gases, when the door is closed.

G is a horizontal smoke flue or outlet pipe for the products of combustion from the stove, which extends inward from the collar of the stove, and terminates at a point near the center of the stove body. The inner end of the smoke flue G is supported by a hanger rod g, depending from the top plate of the stove. The smoke flue G has formed on its inner end an enlarged and open top section g', which serves as a seat for a sliding damper G', which is guided and limited in its movements, by a slot and stud connection with one wall of the said seat, as shown at g². The damper G' is operated by a notched hand-rod G², extending outward through a slot in the casing, and held in whatever position the damper may be set by the engagement of one of its notches with one of the walls of the slot in the casing. The purpose of this location of the smoke flue G, is to bring the out draft on the products of combustion at the central point of the stove body, thereby producing a uniformly distributed draft on all parts of the combustion chambers.

Directly below and secured to the inner end of the smoke flue, as shown in Fig. 1, is located a deflector H, for throwing the hot and burning gases outward against the casing of the stove in their course to the mouth of the smoke flue G.

K represents a removable ash-pan in the ash-pit of the stove, under the grate.

Referring now especially to Fig. 1, the further action when the fire is burning may be traced as follows: Supposing the registers c' and d² to be in the position shown, and the cover C² being either closed, as shown, or in an open position, the parts will be set for indirect draft. The primary combustion will then take place on the grate section B' and the burning gases therefrom passing upward, will enter through the opening d', into the top of the magazine D. This will ignite the coal and produce a supplemental combustion, at the top of the fuel magazine. Or if the coal be absent at that point, the burning gases will converge to a common focus and by the intense heat thus produced, as fed by the fresh air supplied through the ducts E, the combustion will be rendered substantially complete. The hot air and gases will then pass upward directly from the top of the fuel magazine, if the cover C² be open, or through the perforation c³ in the door, if the cover be closed, and will be thrown outward by the deflector H, against the walls of the casing in the smoke chamber of the stove, and will pass thence around the outer margin of the deflector to the top section of the stove and thence downward into the mouth of the smoke outlet flue G. If the cover C² be closed and the damper G' be partially closed, as shown in Fig. 1, a comparatively slow burning or smothered fire will be produced. If the cover C² be opened and the damper G' be drawn farther out, a more rapid and intense combustion will take place.

On starting the fire, the register d² is closed, so as to shut off the inlet passages d' to the top of the fuel magazine D, and the register c' is thrown into its open position. This will permit a direct draft upward from the grate section B', through the outer margin of the partition C, and thence directly to the mouth of the smoke-flue G. After the fire is well started, the register c' may be closed and the register d² be opened, starting the supplemental combustion at the top of the fuel magazine D. When the parts are set for indirect draft, with the construction as shown in Figs. 1 and 2, a supplemental combustion will always take place, at the top of the fuel magazine D; but if the body of the coal be below the points at which the burning gases enter the fuel magazine, very little, if any coal will be burned from the top of the magazine, the combustion of the gases from the primary combustion chamber, being simply rendered more complete at that point, as hitherto stated. In either case, a large body of additional heat will be produced, at the top of the fuel magazine D. It is an advantage, to construct this fuel magazine D with an expanded or enlarged section d, as shown in Fig. 1, as this gives an expansion chamber for the burning gases; but this enlargement may be dispensed with and a magazine of uniform diameter be employed, such as is shown in Fig. 4. With the constructions shown in Figs. 1 and 4, no combustion whatever will take place, at the center of the body of coal. The solid section B² of the grate shuts off any supply of air at that point; and the ashes from the supplemental combustion, at the top of the fuel magazine, working downward as they will, into the interstices between the pieces of the coal, will prevent any combustion being supported through air which might otherwise enter at the lower end of the fuel magazine. When it is desired to shake out the ashes or clinkers from the base of the body of coal only, the grate section B' may be given a limited shaking motion, without disturbing the central section B² by the shaker-handle B³; and when desired to shake out the ashes from the entire body of the coal, or shake down the coal, the central section B² of the grate may be moved with the outer section B', by moving the shaker-handle B³ through a longer arc. When it is desired to empty the grate, the shaker-handle B³ may be removed and the grate spider be tilted on its trunnions, in the customary way.

In the modification shown in Fig. 5, the fuel magazine D is dispensed with, the fuel being supplied to the grate, through a suitable fuel passage, at the center of the cross partition C. This modification has been illustrated for the purpose of showing that by the use of the partition plate C alone, the fuel may be supplied to the grate in such a way, that it will stack up thereon, in the form of a conical pile, the base of which will not spread outward against the walls of the stove casing. All that is necessary to note, is that the fuel passage at the center of the partition C, must be of the proper size in relation to the diameter of the stove body and of the grate, and be at the proper height above the grate, to secure this result. Suppose, for example, that the slope lines of the cone of fuel permissible on the grate, without spreading against the casing walls be at an angle of forty-five degrees, then the fuel passage at the center of the partition may have its margin terminating at any point on the said slope lines, or in other words, be coincident with any frustum of the desired cone. The same remarks apply as to the size and location of the lower or discharge end of the fuel magazine D, when the same is employed, as shown in Figs. 1 and 4. By dispensing with the ordinary fire-pot, which is made possible by my invention, a large item of expense is saved in construction, and a larger amount of heat is thrown off directly from the grate into the room through the stove casing.

Referring now to Fig. 4, the material modifications, other than those already noted, are the addition of a feed magazine M, extending downward from the top of the stove, the construction of the stove casing with a removable center cap or magazine cover M', the location of the smoke-flue P at the collar, in its customary position with a swinging damper P' controlled from a notched hand-rod P², extending outward through the casing; and in the construction and arrangement of the deflector Q, which in this case is of annular form, secured to the feed magazine M, and extends outward to a junction with the stove casing A, throughout that part of the same on the half of the stove casing containing the collar and the smoke-flue P. By the addition of the feed magazine M, the supply of coal is rendered automatic, as in an ordinary self-feeding stove. It is obvious, that the fuel magazine D might be dispensed with and the feed magazine M be used in conjunction with the partition C alone; or that both the magazine D and the partition C with their immediately connected parts might be dispensed with and the feed magazine M be extended downward to the proper point, and be of such size at its lower end to distribute the coal into a cone of the proper limited spread onto the grate.

A stove constructed in accordance with my invention, especially as shown in Figs. 1 and 4 is very efficient for heating capacity with economy of fuel.

Having regard to their function, in respect to supplying the coal to the grate, the partition C, as shown in Fig. 5, together with the depending magazine D, as shown in Fig. 1, and the feed magazine M, together with the magazine D, as shown in Fig. 4, may all be regarded and generically defined, as a fuel supplying device or feed chamber.

What I claim, and desire to secure by Letters Patent of the United States, is as follows:

1. The combination with the stove casing, of a grate, a cross partition above the grate having a fuel magazine extending downward from its central portion, with a discharge end of such a size relative to the casing and in such a position with respect to the grate that the fuel supplied therefrom will not spread outward against the walls of the casing, and provided with openings near the top of the fuel magazine, for permitting the entrance therein, of the burning gases arising from the grate, substantially as described.

2. The combination with the stove casing and grate, of the cross partition above the grate provided with a register and the depending fuel magazine provided with a register in its side walls and a cover for closing the top of the same, substantially as set forth.

3. The combination with the stove casing and grate, of the cross partition above the grate and the fuel magazine extending downward from the said cross partition, having an enlarged section at its upper end to serve as an auxiliary combustion chamber, substantially as described.

4. The combination with the stove casing and grate, of the cross partition above the grate, the fuel magazine extending downward from said partition provided with an enlarged section at its upper end to serve as an auxiliary combustion and expansion chamber, provided with openings or passages for the entrance of the burning gases arising from the grate and air ducts extending from the exterior of the casing, for supplying air to the burning gases in the auxiliary chamber, substantially as described.

5. The combination with the stove casing A, of a horizontal smoke-flue G, terminating at or near the center of the stove and provided with the damper-seat extension g', of the damper G', having a limited movement on said seat and an operating rod G², substantially as described.

6. The combination with the stove casing A and a suitable grate, of the cross partition C, provided with the register c', the fuel magazine D, provided with the gas passages d' and the register $d^2$, the centrally located deflector H, and the smoke flue G, terminating at the center of the casing above the deflector H, substantially as and for the purpose set forth.

7. The combination with the stove casing and grate, of a cross partition above the grate, the fuel magazine extending downward from said partition and a feed magazine depending from the top of the stove and terminating at or near the partition plate, substantially as and for the purposes set forth.

In testimony whereof I affix my signature in presence of two witnesses.

JAMES ALLINGHAM.

Witnesses:
 HARRY J. ALLINGHAM,
 OLIVE ALLINGHAM.